(12) United States Patent
Kim et al.

(10) Patent No.: US 6,853,614 B2
(45) Date of Patent: Feb. 8, 2005

(54) ABERRATION CORRECTION ELEMENT AND OPTICAL PICKUP ADOPTING THE SAME

(75) Inventors: Tae-kyung Kim, Seoul (KR);
Young-man Ahn, Suwon (KR);
Chong-sam Chung, Suwon (KR);
Hea-jung Suh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 09/822,847

(22) Filed: Apr. 2, 2001

(65) Prior Publication Data

US 2002/0018435 A1 Feb. 14, 2002

(30) Foreign Application Priority Data

Aug. 8, 2000 (KR) ........................................ 2000-45889

(51) Int. Cl.[7] ................................................ G11B 7/00
(52) U.S. Cl. ............................. 369/112.01; 369/112.15; 369/112.22
(58) Field of Search ........................ 369/112.01, 112.15, 369/44.23, 44.25, 112.05, 112.22

(56) References Cited

U.S. PATENT DOCUMENTS 6,480,454 B1 * 11/2002 Wada et al. ........... 369/112.01
6,584,058 B1 * 6/2003 Yoshikawa et al. .... 369/112.01

* cited by examiner

Primary Examiner—Nabil Hindi
(74) Attorney, Agent, or Firm—Stein, McEwen & Bui, LLP

(57) ABSTRACT

An optical pickup includes an aberration correction element to correct chromatic aberration caused by variation of power from a light source when changing between operating modes in a recording medium. The aberration correction includes a first retardation member, which includes a stepped convex pattern with a plurality of steps at one side, and a second retardation member combined with the first retardation member. The second retardation member includes a stepped concave pattern with a plurality of steps at one side facing the first retardation member, the stepped concave pattern corresponding to the stepped convex pattern. The first and the second retardation members include different refractive indices for a light beam, which allows the first and the second retardation members to selectively create a phase difference of an incident light beam according to a polarization of the incident light beam.

46 Claims, 8 Drawing Sheets

ABERRATION CORRECTION ELEMENT AND OPTICAL PICKUP ADOPTING THE SAME

CROSS-REFERENCE TO RELATED APPLICATIONS

This application is based upon and claims priority of Korean Patent Application No. 00-45889 filed Aug. 8, 2000, the contents being incorporated herein by reference.

BACKGROUND OF THE INVENTION

1. Field of the Invention

The present invention relates to an aberration correction element, and an optical pickup including the aberration correction element to correct chromatic aberration caused by variation of power from a light source when changing between operating modes in a high-density recording medium, and which is compatible with high-density recording media and relatively low density digital versatile disc (DVD) family media.

2. Description of the Related Art

In optical recording/reproduction systems, recording density is determined by the size of a focused spot (S). In general, the size of the focused spot (S) is proportional to the wavelength ($\lambda$), and inversely proportional to the numerical aperture (NA).

To reduce the size of the focused spot, high-density optical pickups adopt a light source emitting blue light, and an objective lens having at least 0.6 NA; thus, a higher information recording density is achieved compared to existing compact discs (CD) and DVD family recording media.

A refractive index of optical materials used to manufacture an objective lens for optical pickups, such as glass and plastic, varies with a wavelength shorter than 650 nm. For this reason, when the wavelength of an incident light beam slightly varies within the short wavelength range, a considerable amount of chromatic aberration occurs.

Optical power of the optical recording/reproduction systems varies according to an operating mode, i.e., a recording mode and a reproduction mode. Accordingly, the wavelength of a light beam emitted from the light source varies within a range of about ±2 nm according to the operating mode. As the output power of the light source is increased to record information, the wavelength of light from the light source becomes longer. As for the optical pickup in high-density recording/reproduction systems, which employs the blue light source and the objective lens optimized for a specific wavelength, a large amount of chromatic aberration is caused by a wavelength variation when the operating mode changes from a recording mode to a reproduction mode, and vice versa.

Such chromatic aberration can be corrected by defocusing the objective lens. However, it takes a relatively long period of time to drive the objective lens using an actuator to follow the wavelength variation. Thus, as the change in operating mode is repeated, the quality of recording and reproduction signals during the period of time it takes to drive the objective lens to follow the wavelength variation deteriorates.

Thus, the optical pickup for high-density recording/reproduction systems needs an optical element capable of effectively reducing chromatic aberration caused by the change in wavelength, which occurs when changing the operating mode. In addition, the compatibility with existing DVDs needs to be considered for the high-density optical pickup. However, for DVD-recordable (DVD-R) and multi-layered DVDs, a red light source is used as the light source because of the notable low reflectivity of these types of disks with respect to short wavelength light.

FIG. 1 illustrates a conventional optical pickup including a refracting and diffracting objective lens 9. The refracting and diffracting objective lens 9 focuses light reflected from a beam splitter 5, after having been emitted from a semiconductor laser 1 and collimated by a collimating lens 3, on the recording surface of an optical disc 10. The refracting and diffracting objective lens 9 is an aspherical lens, which has aspherical light receiving and emitting surfaces and diffraction patterns on the aspherical surfaces. The refracting and diffracting objective lens 9 is constructed as a combination of the refracting and diffracting lenses.

Assuming that V is Abbe's number of refracting lens part and $V_{HOE}$ is Abbe's number of diffracting lens part. Further, $n_1$, $n_2$ and $n_3$ are the refractive indices of the refracting and diffracting objective lens 9 with respect to the central, shortest and longest wavelengths $\lambda_1$, $\lambda_2$ and $\lambda_3$ of light emitted from the semiconductor laser 1, respectively. The refracting and diffracting objective lens 9 is designed such that it satisfies the following condition:

$$(1+V_{HOE}/V)(n_2-1)>0.572.$$

where $V=(n_2-1)/(n_1-n_3)$ and $V_{HOE}=\lambda_2(\lambda_1-\lambda_3)$. The refracting and diffracting objective lens 9 has an NA of 0.7 or more, and can eliminate chromatic aberration caused by the wavelength variation emitted from the semiconductor laser 1.

Further, a first skew plate 7a and a second skew plate 7b correct coma aberration caused by skewing of the optical disk 10 in the reproduction mode. The first and the second skew plates 7a and 7b are arranged such that their convex and concave surfaces face outward. As the first and the second skew plates 7a and 7b are moved in opposite directions, the shape of the wavefront changes into the inverse shape of the coma aberration, thereby canceling out the coma aberration caused by the skewing of the optical disc 10. The optical pickup also includes a quarter-wave plate 6, and a photodetector 13.

In terms of the properties of diffraction elements, the optical pickup including the refracting and diffracting objective lens 9 has a low light efficiency which makes it difficult to obtain high optical power sufficient to record information. The conventional refracting and diffracting objective lens 9 has a low light efficiency with respect to the wavelength on the light beam, which is largely deviated from the initial wavelength for the objective lens. Thus, the conventional refracting and diffracting objective lens 9 cannot be adopted for an optical pickup using different wavelengths of light.

SUMMARY OF THE INVENTION

To solve the above problems, it is a first object of the present invention to provide an aberration correction element capable of being adopted in an optical pickup using different wavelengths of light, which causes a phase difference of an incoming light beam according to a polarization of the incoming light beam, so that light efficiency is high.

It is a second object of the present invention to provide an optical pickup adopting an aberration correction element capable of correcting chromatic aberration caused by a wavelength variation of shorter wavelength light when changing operating modes to record information on or to reproduce information from a high-density recording medium. The optical pickup has a high light efficiency and is compatible with high-density recording media and with relatively low-density recording media using different wavelengths of light.

These together with other objects and advantages which will be subsequently apparent, reside in the details of construction and operation as more fully hereinafter described and claimed, reference being had to the accompanying drawings forming a part hereof, wherein like numerals refer to like parts throughout.

To achieve the first and other objects of the present invention, an aberration correction element, including a first retardation member including a stepped convex pattern with a plurality of steps at one side; and second retardation member combined with the first retardation member and including a stepped concave pattern with a plurality of steps at one side facing the first retardation member, the stepped concave pattern corresponding to the stepped convex pattern, wherein the first retardation member and the second retardation member include different refractive indices for an incident light beam, which allows the first and the second retardation members to selectively create a phase difference of the incident light beam according to a polarization of the incident light beam.

A pitch in the optical axis's direction of each of the plurality of steps of the first and the second retardation members is an integer multiple of $\lambda 0/(n0a-n0b)$, wherein $\lambda 0$ is a wavelength of the first light beam, and $n0a$ and $n0b$ are the refractive indices of the first and the second retardation members, respectively, for the wavelength $\lambda 0$.

The first and the second retardation members are formed of an anisotropic material. An aberration correction element includes a retardation member selectively varying a phase difference of an incoming light beam according to the polarization of the incoming light beam.

An aberration correction element includes a first retardation member including a stepped convex pattern with a plurality of steps at one side; and a second retardation member combined with the first retardation member and including a stepped concave pattern with a plurality of steps at one side facing the first retardation member, the stepped concave pattern corresponding to the stepped convex pattern, wherein the first retardation member and the second retardation member include different refractive indices for a first light beam allowing the first and the second retardation members to selectively create a phase difference of the first light beam according to a polarization of the first light beam, and a substantially equal refractive index for a second light beam perpendicular to the first light beam.

Further, the stepped convex pattern and the stepped concave pattern are concentric around the optical axis, and the phase difference caused by the first and the second retardation members according to the first light beam includes the wavelength $\lambda 1$ increasing or decreasing with respect to distance from the optical axis.

In addition, the second retardation member includes a plurality of stepped concave patterns, such that the stepped convex pattern of the first retardation member are fitted to the stepped concave pattern of the second retardation member.

It is another object of the present invention to provide an optical pickup for a recording/reproduction system including a recording medium, the optical pickup including a first light source emitting a first light beam including a wavelength suitable for the recording medium; a second light source emitting a second light beam perpendicular to the first light beam; an objective lens focusing the first light beam to form a light spot on the recording medium; an optical path changing unit arranged on an optical path between the first light source and the objective lens, altering a traveling path of the first light beam; a first retardation member; a second retardation member combined with the first retardation member, wherein the first retardation member and the second retardation member include different refractive indices for the first light beam; a first aberration correction element arranged on the optical path between the optical path changing unit and the objective lens to correct chromatic aberration caused by a wavelength variation of the first light beam, wherein the first aberration correction element includes the first retardation member and the second retardation member; and a photodetector receiving the first light beam through the objective lens and the optical path changing unit after the first light beam is reflected from the recording medium, wherein a phase difference caused by the first and the second retardation members according to a wavelength variation of the first light beam increases or decreases with respect to distance from an optical axis between the first light source and the recording medium.

The first and second retardation members of the first aberration correction member are combined with each other, and the first retardation member includes a stepped convex pattern including a plurality of steps concentric around the optical axis, and the second retardation member includes a stepped concave pattern facing the stepped convex pattern, the stepped concave pattern corresponds to the stepped convex pattern, and a phase difference caused by the first and the second retardation members increases or decreases with respect to distance from the optical axis.

The optical pickup may further include a second light source for emitting a second light beam as a second beam perpendicular to the first polarization of the first light beam, the second light beam including a relatively long wavelength low-density recording medium. A second aberration correction member arranged on the optical path between the optical path changing unit and the objective lens, to selectively create a phase difference of an incident light beam according to the polarization of the incident light beam, wherein the second aberration correction member including a third retardation member with at least two stepped convex patterns each of which includes a plurality of steps and a fourth retardation member with at least two stepped concave patterns corresponding to the stepped convex patterns, to correct chromatic aberration caused by a wavelength variation according to the second light beam and/or spherical aberration caused by a substrate thickness variation according to the low-density recording medium.

Furthermore, the high-density recording medium is a recording medium having a higher density than digital versatile disc (DVD) family media, and/or the low-density recording medium is a DVD family recording medium. The optical path changing unit is arranged on the optical path where the first light source and the second light source are perpendicular to each other and are aligned with the optical axis.

Alternatively, the first and the second light sources are arranged close to each other. One of the first light source and the second light source is aligned with the optical axis, and the other light source is off the optical axis close to the light source aligned with the optical axis, and the first aberration correction element corrects for a field aberration with respect to the polarized light beam emitted from the light source off the optical axis.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, the preferred embodiment of the present invention will be described in greater detail with reference to the accompanying drawings.

Figure 1:
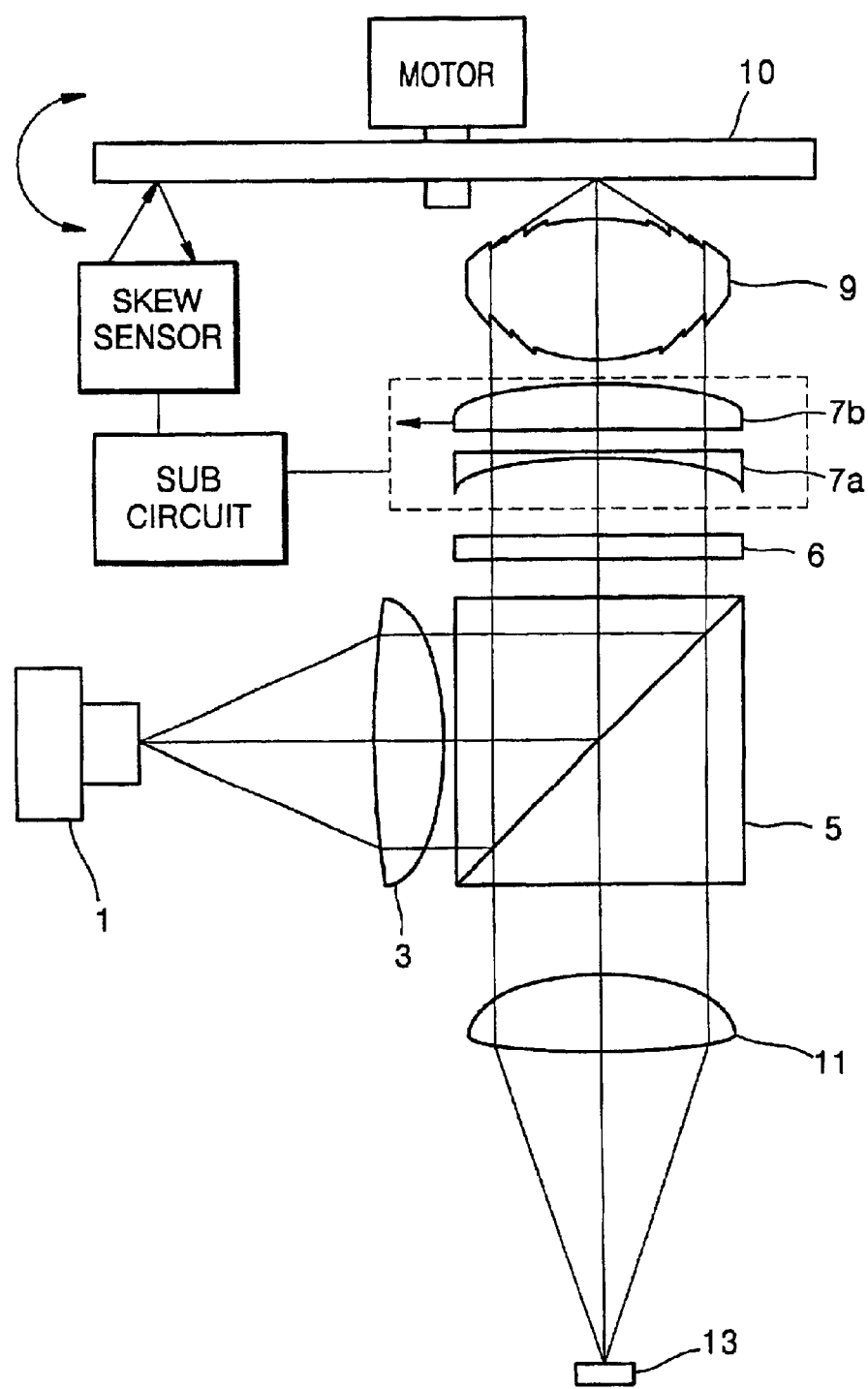
FIG. 1 illustrates a conventional optical pickup including a refracting and diffracting objective lens.
Figure 2:
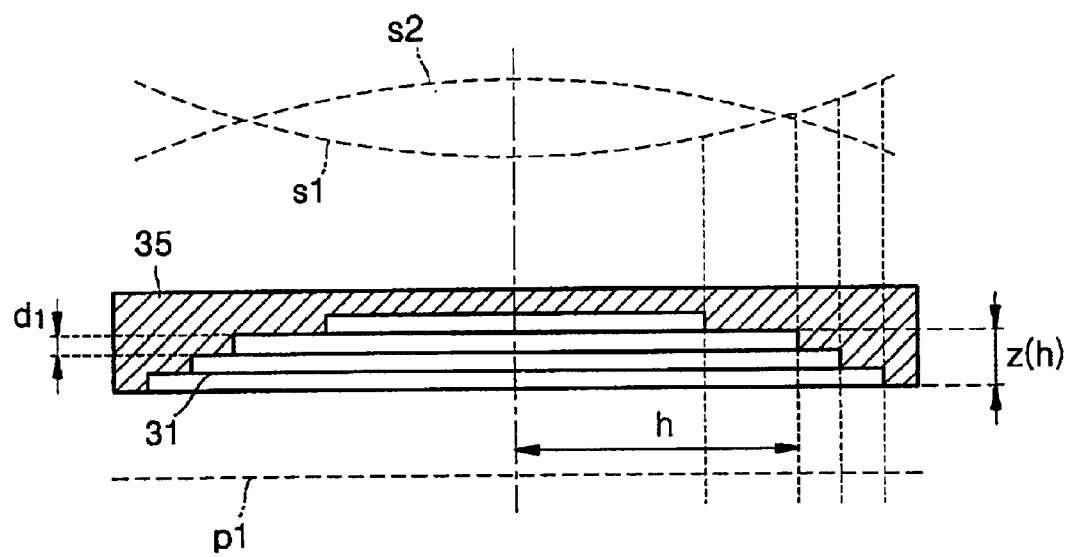
FIG. 2 illustrates a cross-sectional view of an aberration correction element including a first retardation element and a second retardation element, in accordance with an exemplary embodiment of the present invention.

Referring to FIG. 2, an aberration correction element includes a combination of a first retardation member 31 and a second retardation member 35, having different refractive indices for a first polarized light beam, in accordance with an exemplary embodiment of the present invention. Each of the first and the second retardation members 31 and 35 has a stepped pattern concentric around an optical axis, where the stepped pattern of the first retardation member 31 is complementary to the stepped pattern of the second retardation member 35. In particular, the first retardation member 31 has a stepped convex pattern at one side thereof, which is concentric around the optical axis. The second retardation member 35 has a stepped concave pattern at one side thereof, which is fitted to the stepped convex pattern of the first retardation member 31. The second retardation member 35 is arranged such that its stepped concave pattern faces the stepped convex pattern of the first retardation member 31. Thus, the first and second retardation members 31 and 35 are combined such that the stepped convex and concave patterns face each other.

In an exemplary embodiment, the first retardation member 31 has a different refractive index than the second retardation member 35 for a first polarized light beam, and substantially the same refractive index for a second polarized light beam which is perpendicular to the first polarized light beam. Thus, a phase difference of an incoming light beam occurs according to a polarization of the incoming light beam as it passes through the first and the second retardation members 31 and 35.

The polarization-dependent refraction properties of the first and the second retardation members 31 and 35 can be achieved by using an anisotropic material with respect to the refractive index. The polarization-dependent refraction properties can also be achieved by appropriately arranging the optical axes of the anisotropic materials such that the refraction index of the first retardation member 31 varies depending on the polarization of the incident light beam. Further, the refraction index is different for the first and the second polarized light beams; and the second retardation member 35 has a constant refractive index regardless of the polarization of the incident light beam. In an exemplary embodiment, the first and the second retardation members 31 and 35 are made of the same anisotropic material. The first retardation member 31 is arranged such that it has an ordinary refractive index or an extraordinary refractive index according to the polarization of the incident light beam. The second retardation member 35 is arranged such that it has an ordinary refractive index regardless of the polarization of the incident light beam. The anisotropic material is classified into a positive type or a negative type. The positive type is for the retardation member having a larger extraordinary refractive index than an ordinary refractive index. The negative type is for the retardation member having a larger ordinary refractive index than the extraordinary refractive index.

In an exemplary embodiment, the aberration correction element is designed such that a pitch, d1, for each single step of the stepped convex pattern of the first retardation member 31 and the stepped concave pattern of the second retardation member 35 is an integer multiple of $\lambda 0/(n0a-n0b)$, where $\lambda 0$ is a wavelength of a first polarized light beam for which an objective lens to be used is designed, and n0a and n0b are refractive indices of the first and the second retardation members 31 and 35, respectively, for the first polarized light beam.

Regarding the operation of the aberration correction element in accordance with an exemplary embodiment of the present invention, the phase difference caused by the first and the second retardation members 31 and 35 according to a wavelength variation from $\lambda 0$ to $\lambda 1$ of the first polarized light beam is expressed as $((n1a-n1b) \cdot z(h))$, where n1a and n1b are the refractive indices of the first and the second retardation members 31 and 35, respectively, for the wavelength λ1, h is a distance from the optical axis, and z(h) is the height from a light receiving surface of the first retardation member 31 or the second retardation member 35 to a particular step of the first or the second retardation member 31 or 35 at the distance h. The phase difference with respect to the wavelength variation from λ0 to λ1 discontinuously increases or decreases according to the distance from the optical axis.

The aberration correction element having the configuration described above, corrects chromatic aberration of light from a condensing lens which is caused by a relatively small variation of the wavelength of the incident light. Specifically, the degree of such chromatic aberration caused by the relatively small wavelength variation increases or decreases symmetrically around the optical axis with respect to distance from the optical axis. Thus, the aberration correction element of FIG. 2, which has a stepped pattern being concentric around the optical axis, can correct for chromatic aberration caused by the wavelength variation of the first polarized light beam.

For example, in the configuration of the aberration correction element, the first retardation member 31 is arranged at the light receiving side and the second retardation member 35 is arranged at the light emitting side. The first retardation member 31 has a larger refractive index than the second retardation member 35 for the first polarized light beam. When a wavelength of a planar-wavefront first polarized light beam deviates from the wavelength for which the objective lens is designed and enters the aberration correction element, the first polarized light beam is shaped into a convex wavefront, s1, and moves toward the aberration correction element. The first polarized light beam is shaped into the convex wavefront because the degree of retardation by the aberration correction element becomes smaller with respect to distance from the optical axis. In contrast, when the second retardation member 35 has a larger refractive index than the first retardation member 31 for the first polarized light beam, the first polarized light beam originally having a planar wavefront is shaped into a concave wavefront, s2, and moves toward the aberration correction element, opposite to the convex wavefront, s1.

When an optical system with a minor wavelength variation includes the aberration correction element of FIG. 2 having the stepped pattern concentric around the optical axis, chromatic aberration caused by a minor wavelength variation, for example, of a first polarized light beam, can be corrected by changing the shape of the wavefront of the incident first polarized light into the invades shape of chromatic aberration incurred by a condensing lens.

In particular, the curvature of the wavefront of a light beam from the aberration correction element increases as the number of the steps of the stepped pattern increases. The slope of the outgoing wavefront depends on the width of each step and depends on the refractive index variations of the first and the second retardation members 31 and 35 for an incident light wavelength. Accordingly, if the material for the first and the second retardation members 31 and 35 is appropriately selected, and if the number of steps and the width of each step are optimized according to the desired accuracy in correcting the chromatic aberration, the chromatic aberration can be effectively canceled in the optical system.

On the other hand, as described above, when the first and the second retardation members 31 and 35 of the aberration correction element are made of the same anisotropic material thereby having the same refractive index for a second polarized light beam perpendicular to the first polarized light beam, the aberration correction element creates a change in shape of the outgoing wavefront with respect to the first polarized light beam, depending on a wavelength variation of the first polarized light beam. Further, the aberration correction element passes the second polarized light beam irrespective of the wavelength variation, without changing the shape of outgoing wavefront. Thus, the aberration correction element may be included in an optical pickup using two wavelengths of light, which will be later described. If the first and the second retardation members 31 and 35 are a positive type, the planar-wavefront of the first polarized light beam is shaped into the convex wavefront, s1. If the first and the second retardation members 31 and 35 are a negative type, the planar-wavefront of the first polarized light beam is shaped into the concave wavefront, s2, as illustrated in FIG. 2. An ordinary person skilled in the art will appreciate that various changes and modifications are possible to the aberration correction element of FIG. 2 according to the various uses, for example, for use in an optical pickup, without departing from the spirit and scope of the invention.

Figure 3:
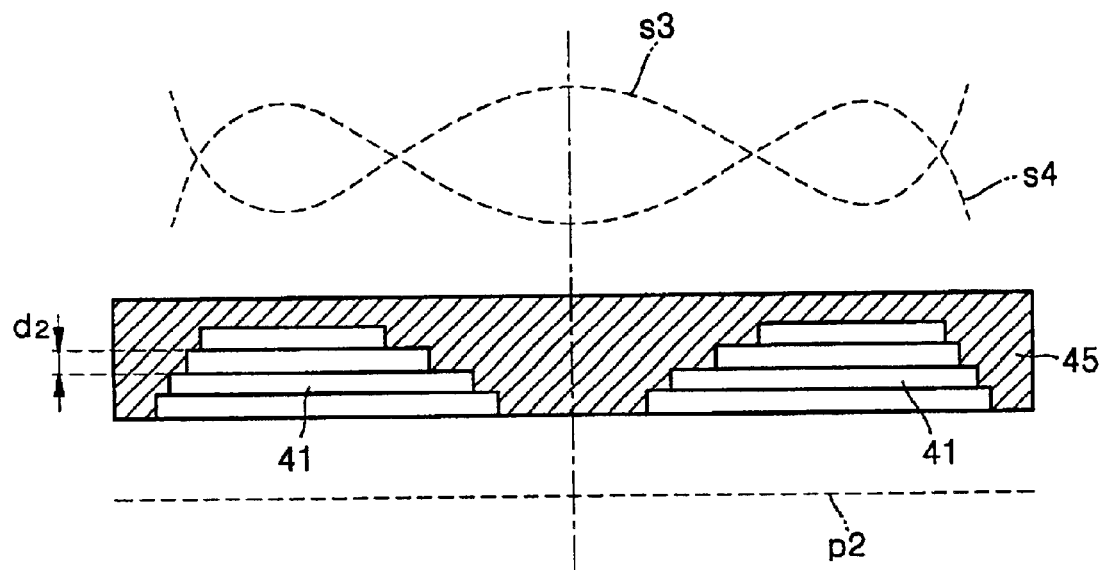
FIG. 3 illustrates a cross-sectional view of an alternative embodiment of the aberration correction element, in accordance with an exemplary embodiment of the present invention.

FIG. 3 illustrates a cross-sectional view of an alternative embodiment of the aberration correction element including at least two stepped patterns for an optical system using two considerably different wavelengths of light, for example, a blue light and a red light, thereby correcting chromatic aberration incurred by a condensing lens due to a relatively large wavelength variation. The aberration correction element shown in FIG. 3 includes a pair of third retardation members 41, each having a stepped convex pattern symmetrical around the optical path, and a fourth retardation member 45 with stepped concave patterns to be fit to the concave patterns of the third retardation members 41. The third and the fourth retardation members 41 and 45 are made of substantially the same materials as those used in the first and the second retardation members 31 and 35.

Chromatic aberration occurs when the red light enters a condensing lens optimized for the blue light. In addition, because an optical system is compatible with different formats recording media, spherical aberration caused by the difference in thickness of the recording media also occurs. As a result, as the red light is condensed onto the recording surface of a relatively thick recording medium, a twin-peak-like wavefront is formed by the chromatic aberration and/or the spherical aberration. In this case, if the optical pickup includes the aberration correction element having at least two stepped patterns, as shown in FIG. 3, the aberrations can be corrected by shaping an incoming planar-wavefront light beam, p2, into the invades shape of the chromatic aberration and/or the spherical aberration.

A wavelength, λ0, is the wavelength of a planar-wavefront incoming light beam, p2, for which an objective lens is designed. Refractive indices, n0a and n0b, are the refractive indices of the third and the fourth retardation members 41 and 45 for the planar-wavefront light beam, p2, respectively. When the pitch, d2, of each step of the third and the fourth retardation members 41 and 45 is not an integer multiple of λ0/(n0a−n0b), the shape of the incoming planar-wavefront light beam p2 can be changed into the invades shape of the aberration, such as a wavefront s3 or s4. If the refractive index of the third retardation member 41 is larger than that of the fourth retardation member 45, the incoming planar-wavefront light beam, p2, is shaped into the wavefront s3. If the refractive index of the third retardation member 41 is smaller than that of the fourth retardation member 45, the incoming planar-wavefront light beam, p2, is shaped into the wavefront s4.

Figure 4:
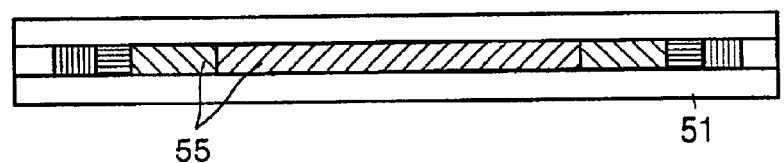
FIG. 4 illustrates a cross-sectional view of another alternative embodiment of the aberration element, in accordance with an exemplary embodiment of the present invention.

FIG. 4 illustrates an alternative a cross-section of the aberration correction element, in accordance with an exemplary embodiment of the present invention. The aberration correction element includes a fifth retardation member and a sixth retardation member and 55 having different refractive indices. The sixth retardation member 55 is divided into a plurality of sections having different refractive indices, and is arranged at the center or at one side of the fifth retardation member 51 such that a phase difference occurs.

In the present embodiment, neighboring sections of the sixth retardation member 55 have different wavelengths. The thickness of the sixth retardation member 55 is consistent. Similar to the first and the second retardation members 31 and 35 a phase difference caused by the aberration correction element of FIG. 4 with respect to a wavelength variation of λ1 from the wavelength λ0, for which the objective lens is designed, is expressed as (n1a−n1b(h))·d, where n1a is the refractive index of the fifth retardation member 51 for the wavelength λ1, n1b(h) is the refractive index of the section of the sixth retardation member 55, h is a distance from the optical axis, and d is the thickness of the sixth retardation member 55, the phase difference is opposite to the aberration caused by the wavelength variation.

Comparing the first and the second retardation members 31 and 35, the thickness d of the sixth retardation member 55 corresponds to the height z(h) from the light receiving surface to a particular step of the first retardation member 31 or the second retardation member 35. In the present embodiment, the width of each section of the sixth retardation member 55 matches the width of each step of the first and the second retardation members 31 and 35, so that the shape of wavefront varies as the wavelength of incoming light beam varies, as shown in FIG. 2. It will be appreciated that the sixth retardation member 55 can be divided into sections such that the same variation of wavefront occurs, as shown in FIG. 3. The aberration correction elements of FIG. 4 can be varied to correct a variety of aberrations as well as chromatic aberrations (e.g., spherical aberration) caused by using different optical recording media in a compatible optical pickup.

Figure 5:
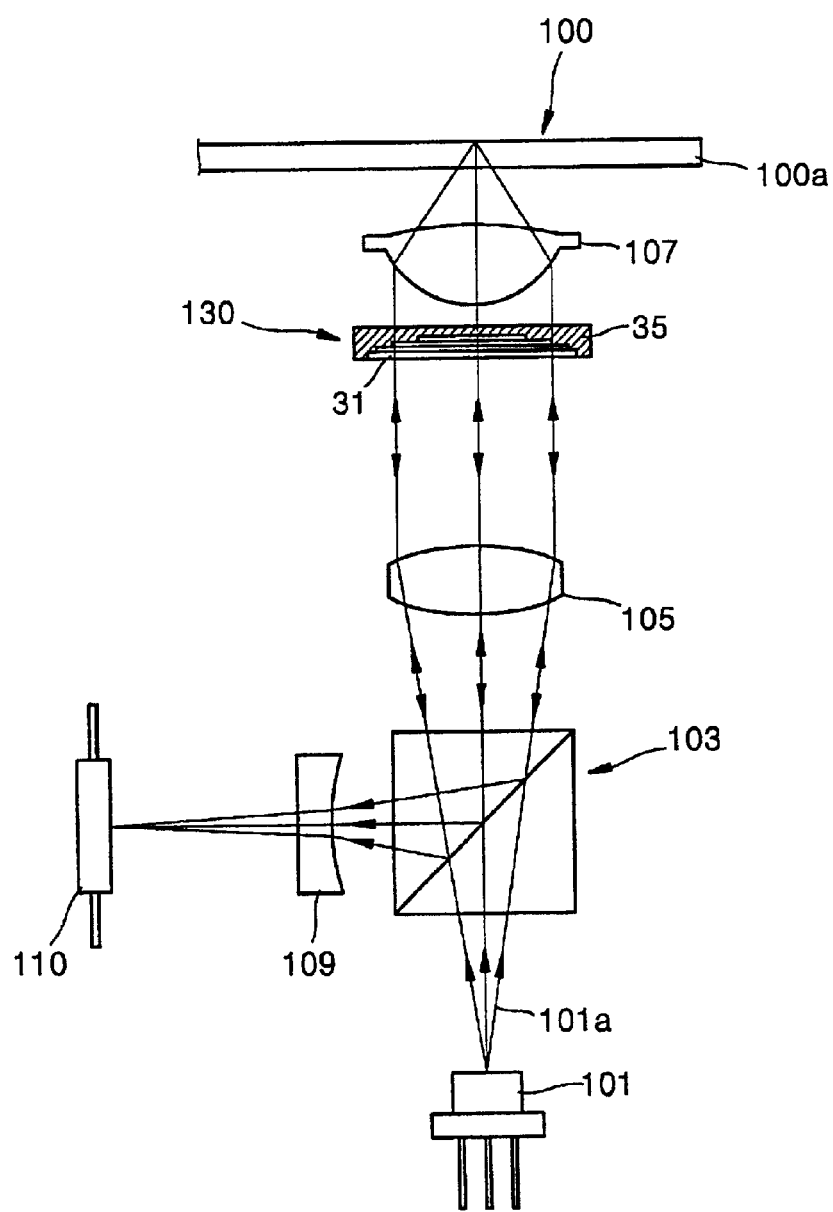
FIG. 5 illustrates an optical arrangement of an optical pickup including an aberration correction element, in accordance with an exemplary embodiment of the present invention.

FIG. 5 illustrates an optical arrangement of an optical pickup including an aberration correction element in accordance with an exemplary embodiment of the present invention. The optical pickup includes a first light source 101 for emitting a first light beam 101a having a relatively short wavelength. An objective lens 107 focuses the first light beam 101a from the first light source 101 to form a light spot on a recording medium 100. An optical path changing unit 103 changes the traveling path of the first light beam 101a from the first light source 101. A first aberration correction element 130 is arranged along the optical path between the optical path changing unit 103 and the objective lens 107, to correct chromatic aberration caused by a variation of wavelength of the first light beam 101a from the first light source 101. A photodetector 110 receives the first light beam 101a passed through the objective lens 107 and the optical path changing unit 103 after having been reflected by the recording medium 100.

The first light source 101 may be a semiconductor laser emitting the first light beam 101a having a relatively short wavelength. For instance, the first light beam 101a may be a blue light having a wavelength of about 405 nm. Accordingly, the first light beam 101a emitted from the first light source 101 is a light beam polarized in a particular direction. In an exemplary embodiment, the objective lens 107 is designed to be suitable for the wavelength of the first light beam 101a emitted from the first light source in a recording or reproduction mode.

The optical path changing unit 103 is disposed along the optical path between the first light source 101 and the objective lens 107. The optical path changing means 103 alters the optical path of the first light beam 101a such that the first light beam 101a is directed toward the recording medium 100, and the first light beam 101a reflected by the recording medium 100 is directed toward the photodetector 110. In an alternative, rather than using the optical path changing unit 103, a prism type beam splitter, a plate type beam splitter, or a combination of a polarization beam splitter, or a quarter-wave plate for the wavelength of light from the first light source 101 may be used.

In an exemplary embodiment, a collimating lens 105 collimates the first light beam 101a and is disposed between the first light source 101 and the objective lens 107. A sensing lens 108 is further disposed on the optical path between the optical path changing unit 103 and the photodetector 101.

The above-mentioned optical elements are designed and arranged to be appropriate for a high-density recording medium 100a, so-called high-definition digital versatile disc (HD-DVD), having a recording density greater than that of DVD family recording media.

Figure 6A:
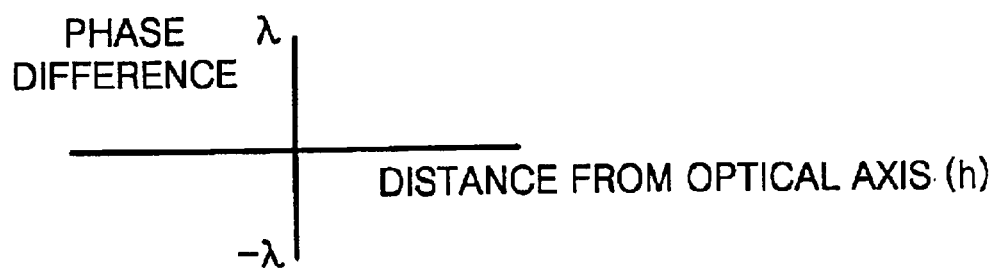
FIG. 6A illustrates no chromatic aberration in a reproduction mode using an objective lens optimized for a wavelength of the reproduction mode.
Figure 6B:
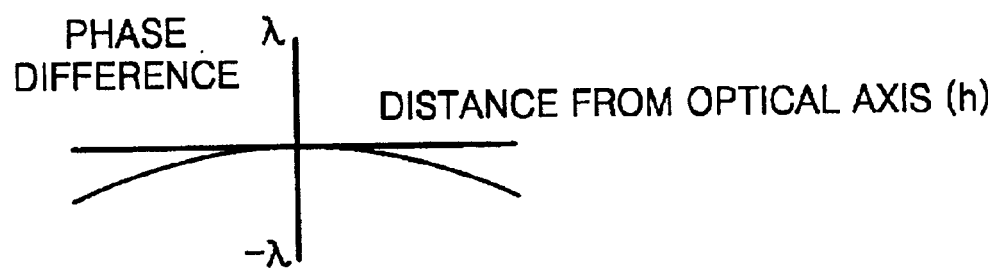
FIG. 6B illustrates chromatic aberration in a recording mode using the objective lens optimized for the wavelength of the reproduction mode.

If the objective lens 107 is designed to focus the first light beam 101a for a wavelength in the reproduction mode, for example, 405 nm, chromatic aberration occurs in the recording mode because the wavelength of the first light beam 101a become slightly longer, for example, 406 nm, to satisfy an increased in optical power needed in the recording mode. In other words, as shown in FIG. 6A, if the first light beam 101 in the reproduction mode has a wavelength of 405 nm, and the objective lens 107 is optimized for that wavelength, chromatic aberration does not occur in the reproduction mode. However, as shown in FIG. 6B, when the operating mode is changed to the recording mode chromatic aberration occurs as the first light beam 101a passes through the objective lens 101a, due to the slight wavelength variation. Such chromatic aberration caused by the slight wavelength variation of light between recording and the reproduction modes in the optical system adopting the high-density recording medium 101a, can be corrected by the first correction element 130, in accordance with the present invention. The first correction element, 130 is arranged on the optical path between the optical path changing unit 103 and the objective lens 107.

As the mode of an optical system adopting the high-density recording medium 110a is changed from the reproduction mode to the recording mode, and vice versa, the wavelength of the first light beam 101a varies within a relatively narrow range, i.e., within the range of ±2 nm. Thus, it is preferable to use the first aberration correction element 130 having stepped convex-concave patterns being concentric around the optical axis, as as shown in FIG. 2. The stepped convex-concave patterns of the first aberration correction element 130 are designed so that the pitch in the optical axis's direction of each step is an integer multiple of 405 nm/(n0a−n0b), where n0a and n0b are the refractive indices of the first and the second retardation members 32 and 35, respectively. The first aberration correction element 130 with respect to the first light beam 101a is a 405 nm p-polarized light beam. Also, when the objective lens 107 is exposed to chromatic aberration, as illustrated in FIG. 6B, with respect to the wavelength variation from 405 nm to 406 nm of the first light beam 101a, the first aberration correction element 130 is designed to cause the phase difference expressed as ((n11a−n11b)·z(h)), where n11a and n11b are the refractive indices of the first and the second retardation members 31 and 35 for the wavelength of 406 nm, h is a distance from the optical axis, and z(h) is the height from the light receiving surface to a particular step of the first and the second retardation member at the distance h. The phase difference caused by the first and the second aberration correction members 31 and 35 results in a wavefront which is the inverse shape of the chromatic aberration shown in FIG. 6B.

Because the outgoing wavefront from the first aberration correction element 130 has the inverse shape of the chromatic aberration incurred by the objective lens 107 with respect to a slight wavelength variation of the first light beam 101a, the chromatic aberration can be canceled by subtraction. Alternatively, the first aberration correction element 130 may have the configuration shown in FIG. 4.

Figure 7:
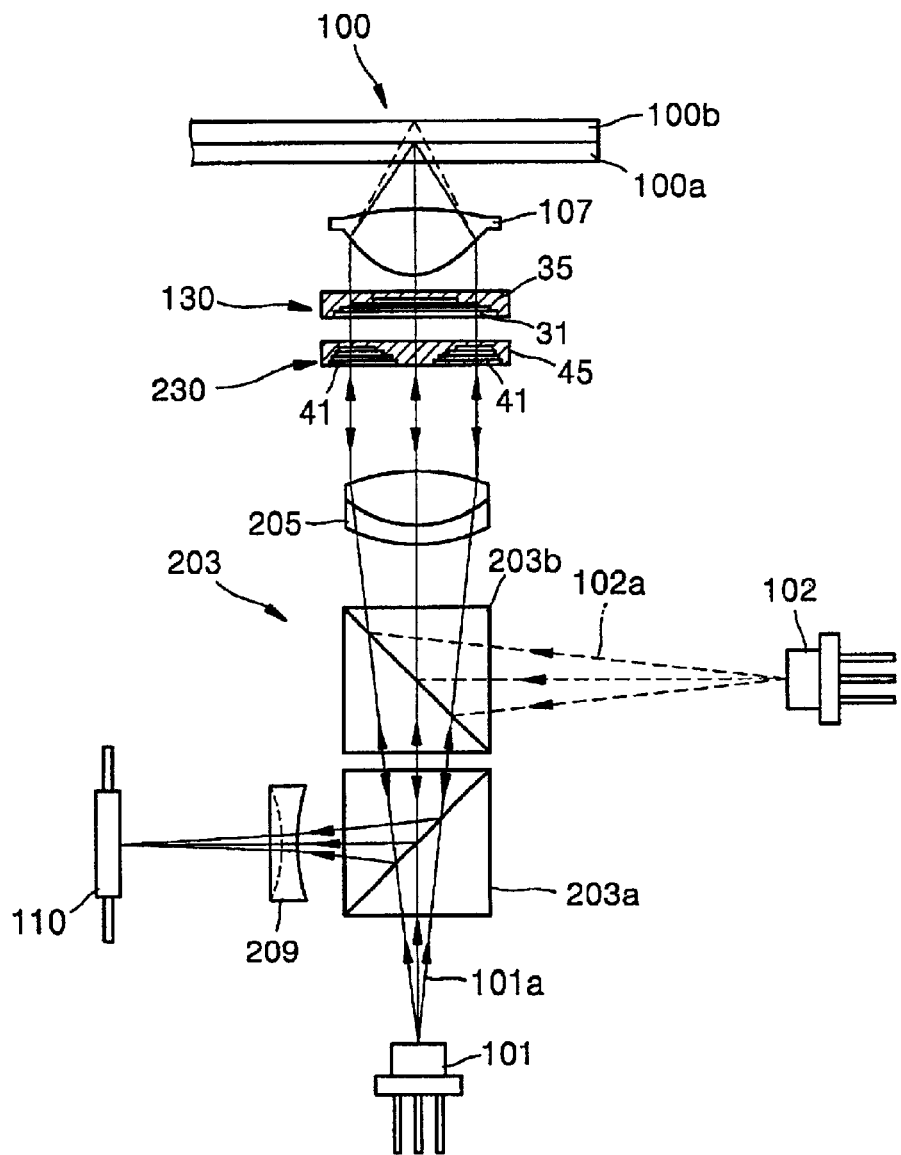
FIG. 7 illustrates an alternative embodiment of the optical pickup including an aberration correction element, in accordance with an exemplary embodiment of the present invention.

FIG. 7 illustrates an alternative embodiment of the optical pickup including an aberration correction element in accordance with an exemplary embodiment of the present invention. In addition to the optical elements shown in FIG. 5, the optical pickup of FIG. 7 further includes a second light source 102 for emitting a second light beam 102 having a relatively long wavelength suitable for a low-density recording medium 100b; and an optical path changing unit 203 arranged to be suitable for both the first and the second light sources 101 and 102. The optical pickup of FIG. 7 is designed to be compatible with the high-density recording medium 100a, and the low-density recording medium 100b, having a density lower than that of the high-density recording medium 100a. Alternatively, the objective lens 107 and the photodetector 110 can be designed to be suitable for both the first light beam 101a and the second light beam 102a.

The low-density recording medium 100b is a DVD family recording medium, and the substrate thickness of the low-density recording medium 100b is about 0.6 mm. The substrate thickness of the high-density recording medium 100a is approximately 0.6 mm or less.

Like the first light source 101, a semiconductor laser may be used as the second light source 102. The second light source 102 is arranged such that the major polarization direction of the second light beam 102a, which has, for example, a wavelength of about 650 nm, is perpendicular to the major polarization direction of the first light beam 101a so that the waveform variation of the second light beam 102a is not caused by the first aberration correction element 130. The first and the second light sources 101 and 102 are arranged such that the major polarization directions of the polarized light beams, i.e., the first and the second light beams 101a and 102a, are perpendicular to each other.

The first aberration correction element 130 is designed such that the first and the second retardation members 31 and 35 have the same refractive index for the second light beam 102a e.g., as an s-polarized light beam to pass the second light beam 102a without changing the shape of the waveform. Accordingly, the first and the second retardation members 31 and 35 are formed of the same anisotropic material, and the optical axis of each of the first and the second retardation members 31 and 35 are arranged such that their refractive indices are different for the first light beam 101a, but the same for the second light beam 102a. The first aberration correction element 130 changes the shape of wavefront for the first light beam 101a if there is a wavelength variation, but not for the second light beam 102a. The optical path changing unit 203 is disposed on the optical path between the first and the second light sources 101 and 102, and the objective lens 107, and alters the optical paths of the first and the second light beams 101a and 102a from the first and the second light sources 101 and 102, respectively.

In the embodiment shown in FIG. 7, the optical path changing unit 203 allows the first and the second light sources 101 and 102 to be aligned with the optical axis. A first beam splitter 203a and a second beam splitter 203b transmit or reflect the first and the second light beams 101a and 102a from the first and the second light sources 101 and 102, respectively, directing the first and the second light beams 101a and 102a toward the optical recording medium 100. In particular, the first beam splitter 203a transmits a portion of the first light beam 101a such that it is directed toward the recording medium 100. The second beam splitter 203b reflects a portion of the second light beam 102a such that it is directed toward the recording medium 100. Accordingly, after being reflected from the recording medium 100, both the first and the second light beams 101a and 102a pass through the second beam splitter 203b and are reflected by the first beam splitter 203a directed towards the photodetector 110. Although a cubic beam splitter is adopted as the first and the second beam splitters 203a and 203b in FIG. 7, it will be appreciated that a plate or prism type beam splitter may be used as the first and the second beam splitters 203a and 203b.

Figure 8:
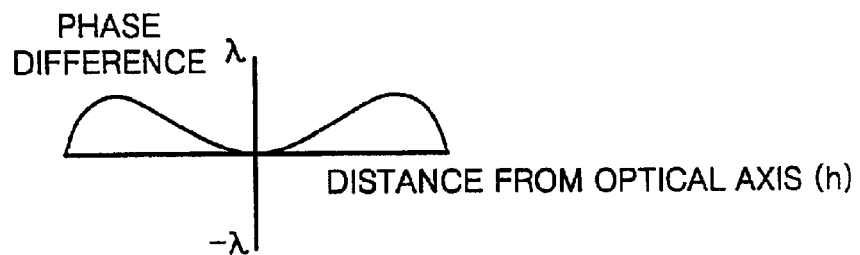
FIG. 8 illustrates aberration occurring on the optical pickup of FIG. 7, optimized for shorter wavelength of light and for a high-density recording medium, when a longer wavelength of light is focused on a low-density recording medium.

Because the objective lens 107 is optimized for the first light beam 101a, for example, having a wavelength of 405 nm, chromatic aberration may occur as illustrated in FIG. 8, when the second light beam 102a is emitted to record or to reproduce information to/from the low-density recording medium 100b. Such chromatic aberration is caused by a wavelength variation and/or the spherical aberration caused by the difference in thickness between the high-density recording medium 100a and low-density recording medium 100b. Thus, the optical pickup further includes a second aberration correction element 230 on the optical path between the optical path changing unit 203 and the objective lens 107 the second correction element 230 corrects the chromatic aberration and/or spherical aberration caused when the objective lens 107 is optimized for the first light beam 101a and the second light beam 102a is emitted.

In an exemplary embodiment, the second aberration correction element 230 is designed such that it passes the first light beam 101a without causing any wavefront variation, causing a phase difference for the second light beam 102a. Thus, the outgoing wavefront from the second aberration correction element 230 has the inverse shape of the chromatic aberration and/or spherical aberration, thereby canceling the aberrations.

In an alternative embodiment, the aberration correction element having at least two stepped patterns shown in FIG. 3 can be used as the second aberration correction element 230. In particular, the second aberration correction element 230 would include the third retardation members 41 and the fourth retardation member 45, which is fitted to the third retardation member 41. The third and the fourth retardation members 41 and 45 would be formed of the same anisotropic material, and would be designed such that the third and the fourth retardation members 41 and 45 have different refractive indices for the second light beam 102a (e.g., as s-polarized light beam), and have the same refractive index for the first light beam 101a (e.g., as p-polarized light beam). In addition, in order to shape the wavefront for the second light beam 102a into the inverse shape of the aberration, where n20a and n20b are the refractive indices of the third and the fourth retardation members 41 and 45, respectively, for the second light beam 102 having a wavelength of 650 nm, the second aberration correction element 230 would be designed such that the pitch, d2, in the direction of the optical axis of each step of the third and the fourth retardation members 41 and 45 is not an integer multiple of 650 nm/(n20a−n20b).

For example, as shown in FIG. 8, when the chromatic aberration and/or the spherical aberration occur with respect to the second light beam 102a, the third and the fourth retardation members 41 and 45 of the second aberration correction element 230 are made of the same negative type anisotropic material. Thus, the wavefront of the incoming light beam can be changed into the inverse shape of the chromatic aberration and/or the spherical aberration to correct for the aberrations. Alternatively, if the third and the fourth retardation members 41 and 45 are made of the same positive type anisotropic material, the locations of the third and the fourth retardation members 41 and 45 relative to each other may be changed to cancel the aberrations. Alternatively, the second aberration correction element 230 can be modified into a configuration corresponding to the aberration correction element shown in FIG. 4.

Thus, the chromatic aberration incurred by the objective lens 107, which is optimized for the first light beam 101a when the second light beam 102a (e.g., red light) is condensed by the objective lens 107, can be removed by including in the optical pickup the second aberration correction element 230. Similarly, spherical aberration caused by the difference in thickness between the high-density recording medium 100a and the low-density recording medium 100b can be also removed using the second correction element 230. If the high-density recording medium 100a and the low-density recording medium 100b have the same thickness, it is enough to design the second aberration correction element 230 so that the second aberration correction element 230 can correct the chromatic aberration incurred by the objective lens 107 with respect to the second light beam 102a.

Referring to FIG. 7, a collimating lens 205 may include a combination of negative power and positive power lenses, such that the collimating lens 205 can correct for chromatic aberration caused by a relatively large wavelength difference between the first and the second light sources 101a and 102a, and can collimate the first and the second light beams 101a and 102a. The collimating lens 205 is arranged, for example, before the first and/or the second aberration correction elements 130 and 230, such that the first and/or the second aberration correction elements 130 and 230 can receive parallel light beams.

A sensing lens 209 is constructed to allow the photodetector 110 to detect better quality signals. Specifically, the sensing lens 209 may be provided to correct chromatic aberration caused by a relatively large wavelength difference between the first and the second light beams 101a and 102a passed through the first and the second aberration correction elements 103 and 230 after having been reflected by the recording medium 100.

When the first and the second aberration correction elements 130 and 230 are included in the optical pickup, as shown in FIGS. 5 and 7, the first and the second aberration correction elements 130 and 230 can correct for aberrations by changing a planar-wavefront of an incoming light beam according to the operation mode, i.e., the recording and/or the reproduction mode, and the type of recording medium adopted.

Figure 9A:
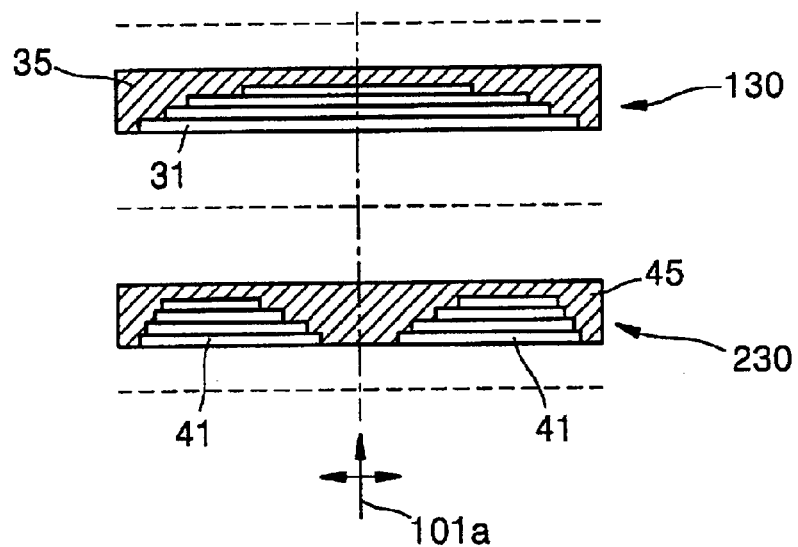
FIG. 9A illustrates a first aberration correction element and a second aberration correction element in the optical pickup of FIG. 7 correcting aberrations by changing a planar-wavefront of an incoming beam in the reproduction mode for the high-density recording medium.
Figure 9B:
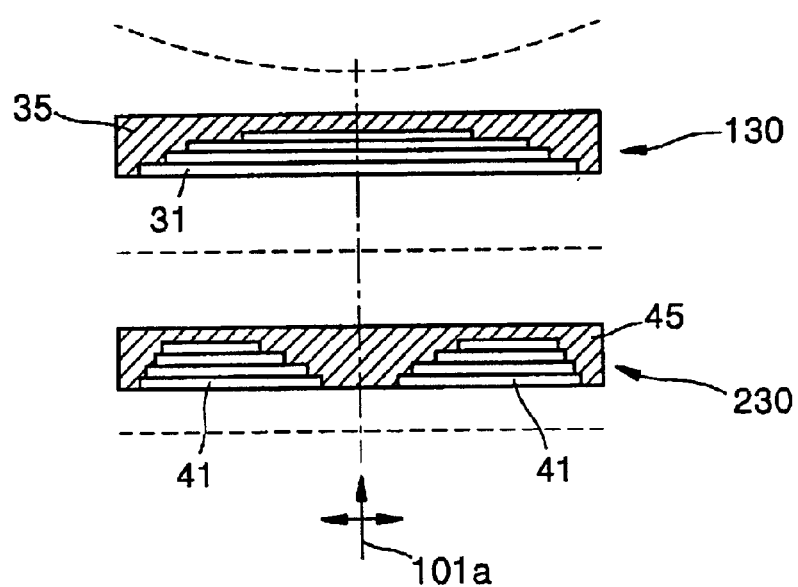
FIG. 9B illustrates the first aberration correction element and the second aberration correction element in the optical pickup of FIG. 7 correcting aberrations by changing a planar-wavefront of an incoming light beam in the recording mode for the high-density recording medium.
Figure 9C:
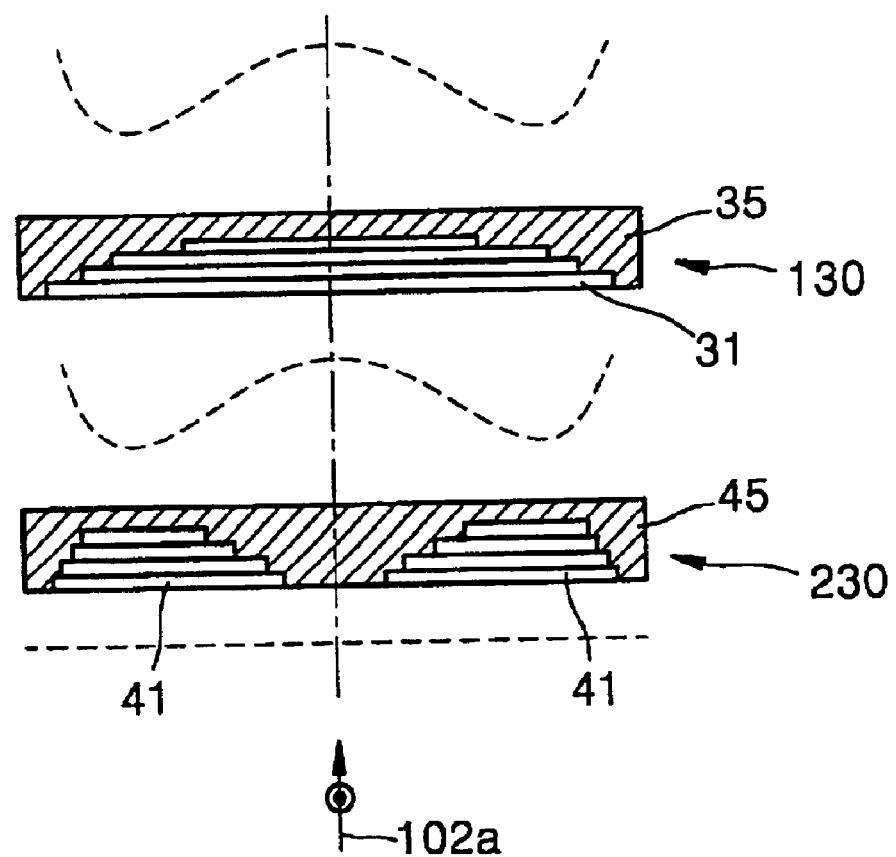
FIG. 9C illustrates the first aberration correction element and the second aberration correction element in the optical pickup of FIG. 7 correcting aberrations by changing a planar-wavefront of an incoming light beam in the recording and/or the reproduction mode for the low-density recording medium.

As illustrated in FIGS. 9A through 9C, the first and the second light beams 101a and 102a entering the second aberration correction element 230 are parallel light beams. The objective lens 107 is optimized for the first light beam 101a having a wavelength of 405 nm in the reproduction mode for the high-density recording medium 100a.

Referring to FIG. 9A, in the reproduction mode for the high-density recording medium 100a, there is no wavefront variation as the first light beam 101a (e.g., a p-polarized light beam), emitted from the first light source 101 passes through the second and the first aberration correction elements 230 and 130, successively.

Referring to FIG. 9B, in the recording mode for the high-density recording medium 100a, the wavelength of the first light beam 101a emitted from the first light source 101 is changed to 406 nm. There is no wavefront variation as the first light beam 101a passes through the second aberration correction element 230. However, the shape of the wavefront is changed by the first aberration correction element 103 due to the wavelength variation. The shape of the first light beam 101a from the first aberration correction element 130 is the inversed shape of the aberration as illustrated in FIG. 6B. As a result, chromatic aberration caused in the recording mode for the high-density recording medium 100a can be corrected.

Referring to FIG. 9C, when the low-density recording medium 100b is adopted, the second light beam 102a (e.g., a 650 nm s-polarized light beam), is emitted from the second light source 102 in the recording and/or the reproduction modes. As the second light beam 102a passes through the second aberration correction element 230, the wavefront of the second light beam 102a changes into an inverse shape of the chromatic aberration incurred by the objective lens 107 from the second light beam 102a, and/or the spherical aberration caused by the difference in thickness between the high-density recording medium 100a and the low-density recording medium 100b. As the second light beam 102a passes through the first aberration correction element 130, the shape of the incoming light beam does not change. However, the wavefront of the second light beam 102a from the first and the second aberration correction elements 130 and 230 has the inverse shape of the aberrations incurred, as shown in FIG. 8. As described above, aberrations occurring when information is recorded on or reproduced from the low-density recording medium 100b by the optical pickup optimized for the high-density recording medium can be corrected.

Figure 10:
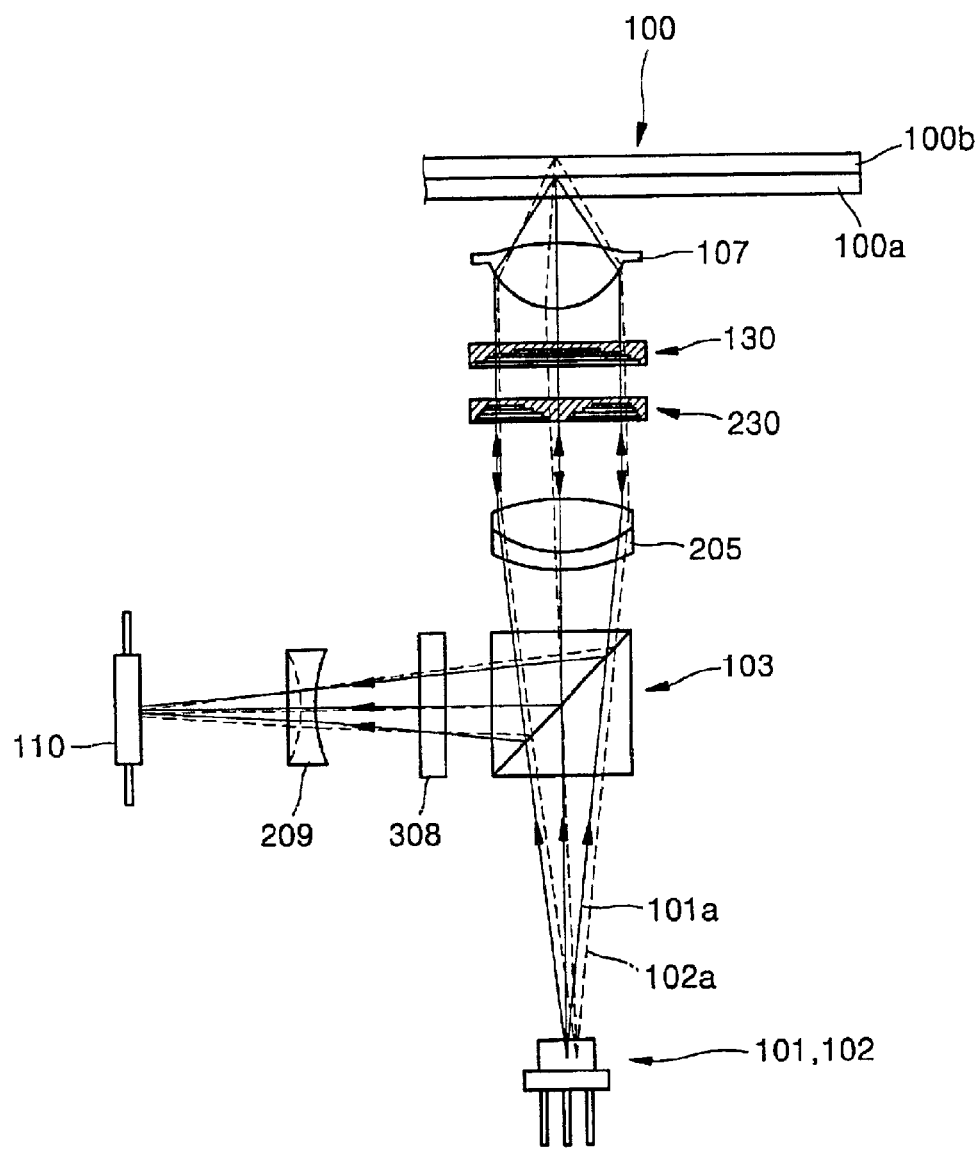
FIG. 10 illustrates the optical arrangement of an alternative exemplary embodiment of the optical pickup of FIG. 7 including aberration correction elements.

FIG. 10 illustrates the optical arrangement of another embodiment of the optical pickup including aberration correction elements, in accordance with an exemplary embodiment of the present invention. The same elements as those illustrated in FIGS. 5 and 7 are designated by the same reference numerals. The second light source 102 is arranged close to the first light source 101.

Figure 11:
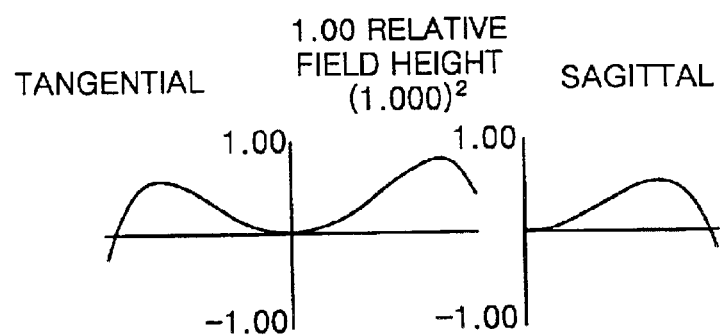
FIG. 11 illustrates a field aberration occurring in the optical pickup of FIG. 10.

The first light source 101 is aligned with the optical axis, and the second light source 102 is arranged close to the first light source 101 and off the optical axis. Thus, the second light beam 102a emitted from the second light source 102 is slightly tilted with respect to the optical axis. Typically, if the optical pickup is designed to be compatible with the high-density recording medium 100a, when the second light beam 102a is emitted slightly tilted to record and/or reproduce information to/from the low-density recording medium, a field aberration and the chromatic and/or spherical aberrations occur, as previously described. The field aberration caused by the tilting is illustrated in FIG. 11.

When the first and the second light sources 101 and 102 are arranged as shown in FIG. 10, the second aberration correction element 230 is designed such that it can correct the field aberration caused by the tilting of the second light beam 102a. However, when the second light beam 102a moves toward the photodetector 110 through the first and the second aberration correction elements 130 and 230, after being reflected from the low-density recording medium 100b, the second light beam 102a would include the field aberration. As a result, a hologram element 208 is disposed on the optical path between the optical path changing unit 103 and the photodetector 110 to eliminate the field aberration.

Alternatively, the second light source 102 rather than the first light source 101, can be aligned with the optical axis. Then, the first light source 101 can be arranged near the second light source 102. In this case, the first aberration correction element 130 is designed such that it can correct the field aberration caused by tilting of the first light beam 101a. The hologram element 308 eliminates the field aberration from the first light beam 101a.

For the aberration correction elements 130 and 230 described in FIGS. 7 through 10, the first aberration correction element 130 is arranged close to the objective lens 107. Although the second aberration correction element 230 is arranged close to the objective lens 107, the shape of the resulting wavefront is the same as in FIGS. 2 through 6.

As previously mentioned, the aberration correction elements according to the present invention correct aberrations by selectively varying a phase difference of an incoming light beam according to the polarization of the incoming light beam. Accordingly, light efficiency is very high.

In particular, in an exemplary embodiment an aberration correction element is designed such that a phase difference caused by the aberration correction element with respect to a wavelength variation of an incident light beam increases or decreases with respect to distance from the optical axis. The aberration correction element is then included in an optical pickup for high-density recording and/or reproduction with a shorter wavelength light beam. Thus, chromatic aberration caused by a slight wavelength variation between the recording and/or the reproduction modes can be corrected with high optical efficiency using the aberration correction element.

The aberration correction element in accordance with the present invention selectively creates a phase difference of incoming light beam according to the polarization of the incoming light thus, the aberration correction element may be included in an optical pickup compatible with high-density and/or low-density recording media using two polarized light beams perpendicular to each other.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An aberration connection element, comprising:
a retardation member selectively varying a phase difference of an incoming light beam according to a polarization of the incoming light beam, wherein the retardation member comprises:
a first retardation member comprising a stepped convex pattern with a plurality of steps at one side; and
a second retardation member combined with the first retardation member and comprising a stepped concave pattern with a plurality of steps at one side facing the first retardation member, the stepped concave pattern corresponding to the stepped convex pattern.

2. The aberration correction element recited in claim 1, wherein the first retardation member and the second retardation member comprise different refractive indices for an incident light beam, which allows the first and the second retardation members to selectively create the phase difference of the incoming light beam.

3. An aberration correction element, comprising:
a first retardation member comprising a stepped convex pattern with a plurality of steps at one side; and
a second retardation member combined with the first retardation member and comprising a stepped concave pattern with a plurality of steps at one side facing the first retardation member, the stepped concave pattern corresponding to the stepped convex pattern;
wherein the first retardation member and the second retardation member comprise different refractive indices for an incident light beam, which allows the first and the second retardation members to selectively create a phase difference of the incident light beam according to a polarization of the incident light beam.

4. An aberration correction element, comprising:
a first retardation member comprising a stepped convex pattern with a plurality of steps at one side; and
a second retardation member combined with the first retardation member and comprising a stepped concave pattern with a plurality of steps at one side facing the first retardation member, the stepped concave pattern corresponding to the stepped convex pattern, wherein the first retardation member and the second retardation member comprise
different refractive indices for a first light beam allowing the first and the second retardation members to selectively create a phase difference of the first light beam according to a polarization of the first light beam; and
a substantially equal refractive index for a second light beam perpendicular to the first light beam.

5. The aberration correction element of claim 4, wherein a pitch in the optical axis's direction of each of the plurality of steps of the first and the second retardation members is an integer multiple of $\lambda 0/(n0a-n0b)$, wherein $\lambda 0$ is a wavelength of the first light beam, and n0a and n0b are the refractive indices of the first and the second retardation members, respectively, for the wavelength $\lambda 0$.

6. The aberration correction element of claim 4, wherein the first and the second retardation members are formed of an anisotropic material.

7. The aberration correction element of claim 5, wherein the phase difference by the first and the second retardation members according to a wavelength variation of the first light beam from the wavelength $\lambda 0$ to $\lambda 1$ of the first light beam is expressed as $((n1a-n1b) \cdot z(h))$, wherein n1a and n1b are the refractive indices of the first and the second retardation members, respectively, for a wavelength $\lambda 1$, and h is a distance from an optical axis, and $z(h)$ is a height from a light receiving surface of the first retardation member or the second retardation member to a particular step of the first retardation member or the second retardation member at the distance h, and the phase difference is opposite to an aberration caused by wavelength variation.

8. The aberration correction element of claim 7, wherein the stepped convex pattern and the stepped concave pattern are concentric around the optical axis, and the phase difference caused by the first and the second retardation members according to the first light beam comprises the wavelength $\lambda 1$ increasing or decreasing with respect to distance from the optical axis.

9. The aberration correction element of claim 7, wherein the second retardation member comprises a plurality of stepped concave patterns, such that the stepped convex pattern of the first retardation member are fitted to the stepped concave pattern of the second retardation member.

10. An optical pickup for a recording/reproduction system comprising a recording medium, the optical pickup comprising:
    a first light source emitting a first light beam comprising a wavelength suitable for the recording medium;
    a second light source emitting a second light beam perpendicular to the first light beam;
    an objective lens focusing the first light beam to form a light spot on the recording medium;
    an optical path changing unit arranged on an optical path between the first light source and the objective lens, altering a traveling path of the first light beam;
    a first retardation member;
    a second retardation member combined with the first retardation member, wherein the first retardation member and the second retardation member comprise different refractive indices for the first light beam;
    a first aberration correction element arranged on the optical path between the optical path changing unit and the objective lens to correct chromatic aberration caused by a wavelength variation of the first light beam, wherein the first aberration correction element comprises the first retardation member and the second retardation member; and
    a photodetector receiving the first light beam through the objective lens and the optical path changing unit after the first light beam is reflected from the recording medium;
    wherein a phase difference caused by the first and the second retardation members according to a wavelength variation of the first light beam increases or decreases with respect to distance from an optical axis between the first light source and the recording medium.

11. The optical pickup of claim 10, wherein
    the first and second retardation members of the first aberration correction member are combined with each other, and the first retardation member comprises a stepped convex pattern comprising a plurality of steps concentric around the optical axis, and
    the second retardation member comprises a stepped concave pattern facing the stepped convex pattern,
    the stepped concave pattern corresponds to the stepped convex pattern, and
    a phase difference caused by the first and the second retardation members increases or decreases with respect to distance from the optical axis.

12. The optical pickup of claim 11, wherein a pitch in the optical axis direction of each of the plurality of steps of the first and the second retardation members is an integer multiple of $\lambda 0/(n0a-n0b)$, wherein $\lambda 0$ is a wavelength of the first light beam for which the objective lens is designed, and $n0a$ and $n0b$ are the refractive indices of the first and the second retardation members, respectively, for the wavelength $\lambda 0$.

13. The optical pickup of claim 11, wherein when the phase difference according to a wavelength variation of the first light beam from the wavelength $\lambda 0$ to a wavelength $\lambda 1$ is expressed as $((n1a-n1b)\cdot z(h))$, wherein $n1a$ and $n1b$ are the refractive indices of the first and the second retardation members for the wavelength $\lambda 1$, and $h$ is a distance from the optical axis, and $z(h)$ is, respectively a height from a light receiving surface of the first retardation member or the second retardation member to a particular step of the first retardation member or the second retardation member at the distance $h$, and the phase difference is opposite to an aberration caused by the wavelength variation.

14. The optical pickup of claim 12, wherein when the phase difference according to a wavelength variation of the first light beam from the wavelength $\lambda 0$ to a wavelength $\lambda 1$ is expressed as $((n1a-n1b)\cdot z(h))$, wherein $n1a$ and $n1b$ are the refractive indices of the first and the second retardation members for the wavelength $\lambda 1$, and $h$ is a distance from the optical axis, and $z(h)$ is, respectively, a height from a light receiving surface of the first retardation member of the second retardation member to a particular step of the first retardation member or the second retardation member at the distance $h$, and the phase difference is opposite to an aberration caused by the wavelength variation.

15. The optical pickup of claim 10, wherein the second light beam comprises a relatively long wavelength low-density recording medium.

16. The optical pickup of claim 15, further comprising a second aberration correction member arranged on the optical path between the optical path changing unit and the objective lens, to selectively create a phase difference of an incident light beam according to the polarization of the incident light beam, wherein the second aberration correction member comprises a third retardation member with at least two stepped convex patterns each of which comprise a plurality of steps and a fourth retardation member with at least two stepped concave patterns corresponding to the stepped convex patterns, to correct chromatic aberration caused by a wavelength variation according to the second light beam and/or spherical aberration caused by a substrate thickness variation according to the low-density recording medium.

17. The optical pickup of claim 16, wherein a pitch in the optical axis direction of each of the plurality of steps of the third and the fourth retardation members is not an integer multiple of $\lambda 0$ $(n0a-n0b)$, wherein $\lambda 0$ is the wavelength of the second light beam, and $n0a$ and $n0b$ are the refractive indices of the first and second retardation members, respectively, for the wavelength $\lambda 0$.

18. The optical pickup of claim 16, wherein when the phase difference according to a wavelength variation of the second light beam from the wavelength $\lambda 0$ to a wavelength $\lambda 1$ light beam is expressed as $((n1a-n1b)\cdot z(h))$, wherein $n1a$ and $n1b$ are the refractive indices of the third and the fourth retardation members, respectively, for the wavelength 1, and $h$ is a distance from the optical axis, and $z(h)$ is a height from a light receiving surface of the third retardation member or the fourth retardation member to a particular step of the third retardation member or the fourth retardation member at the distance $h$, and the phase difference is opposite to the aberration caused by the wavelength variation.

19. The optical pickup of claim 17, wherein when the phase difference according to a wavelength variation of the second light beam from the wavelength $\lambda 0$ to a wavelength $\lambda 1$ is expressed as $((n1a-n1b)\cdot z(h))$, wherein $n1a$ and $n1b$ are the refractive indices of the third and the fourth retardation members, respectively, for the wavelength $\lambda 1$, and $h$ is a distance from the optical axis, and $z(h)$ is a height from a light receiving surface of the third retardation member or the fourth retardation member to a particular step of the third retardation member or the fourth retardation member at the distance h, and the phase difference is opposite to the aberration caused by the wavelength variation.

20. The optical pickup of claim 11 wherein the first and the second retardation members are formed of an anisotropic material.

21. The optical pickup of claim 12, wherein the first and the second retardation members are formed of an anisotropic material.

22. The optical pickup of claim 16, wherein the third and the fourth retardation members are formed of an anisotropic material.

23. The optical pickup of claim 17, wherein the third and the fourth retardation members are formed of an anisotropic material.

24. The optical pickup of claim 20, wherein the first and the second retardation members comprise substantially equal refractive index for the second light beam as a second beam perpendicular to the first polarization of the first light beam.

25. The optical pickup of claim 21, wherein the first and the second retardation members comprise substantially equal refractive indices for the second light beam perpendicular to the first light beam.

26. The optical pickup of claim 22, wherein the third and the fourth retardation members comprise substantially equal refractive indices for the first light beam perpendicular to the second light beam.

27. The optical pickup of claim 23, wherein the third and the fourth retardation members comprise substantially equal refractive indices for the first light beam perpendicular to the second light beam.

28. The optical pickup of claim 10, wherein the first light beam is a blue light, and the recording medium comprises a higher density than a digital versatile disc (DVD) family media.

29. The optical pickup of claim 15, wherein the second light beam is a red light, and the low-density recording medium is a DVD family recording medium.

30. The optical pickup of claim 15, wherein the first light beam is a blue light, and the second light beam is a red light; and the high-density recording medium is a recording medium comprising a higher density than a digital versatile disc (DVD) family media, and the low-density recording medium is a DVD family recording medium.

31. The optical pickup of claim 28, wherein the first light beam comprises a wavelength of about 405 nm.

32. The optical pickup of claim 29, wherein the second light beam comprises a wavelength of about 650 nm.

33. The optical pickup of claim 30, wherein the first light beam comprises a wavelength of about 405 nm, and the second light beam comprises a wavelength of about 650 nm.

34. The optical pickup of claim 28, wherein the thickness of a substrate of the high-density recording medium is 0.6 mm or less.

35. The optical pickup of claim 30, wherein the thickness of a substrate of the high-density recording medium is 0.6 mm or less.

36. The optical pickup of claim 15, wherein the optical path changing unit is arranged on the optical path where the first light source and the second light source are perpendicular to each other and are aligned with the optical axis.

37. The optical pickup of claim 15, wherein the first and the second light sources are arranged close to each other.

38. The optical pickup of claim 15, wherein one of the first light source and the second light source is aligned with the optical axis, and the other light source is off the optical axis close to the light source aligned with the optical axis, and the first aberration correction element corrects for a field aberration with respect to the light beam emitted from the light source off the optical axis.

39. The optical pickup of claim 16, wherein one of the first light source and the second light source is aligned with the optical axis, and the other light source is off the optical axis close to the light source aligned with the optical axis, and the first aberration correction element or the second aberration correction element corrects for a field aberration with respect to the light beam emitted from the light source off the optical axis.

40. The optical pickup of claim 38, further comprising a hologram element on the optical path between the optical path changing unit and the photodetector, to correct a field aberration with respect to the light beam heading towards the photodetector through the first aberration correction element after being emitted from the light source off the optical axis and reflected from a recording medium associated with the light source off the optical axis.

41. The optical pickup of claim 39, further comprising a hologram element on the optical path between the optical path changing unit and the photodetector, for correcting a field aberration with respect to the light beam heading towards the photodetector through the first and/or the second aberration correction elements after being emitted from the light source off the optical axis and reflected from a recording medium associated with the light source off the optical axis.

42. The optical pickup of claim 11, wherein the second retardation member of the first aberration correction element comprises a plurality of sections located at a center or at one side of the first retardation member, and the refractive indices of neighboring sections of the second retardation member are different for the first light beam.

43. The optical pickup of claim 16, wherein the second retardation member of the first aberration correction element comprises a plurality of sections located at a center or at one side of the first retardation member, and/or the fourth retardation member of the second aberration correction element comprises a plurality of sections located at a center or at one side of the third retardation member, and a refractive indices of neighboring sections of each of the second and/or the fourth retardation members are different for the first and/or the second light beams.

44. The optical pickup of claim 42, wherein the phase difference caused by the first aberration correction element according to a wavelength varied from the wavelength for which the objective lens is designed is expressed as $(n1a - n1b(h)) \cdot d$, wherein $n1a$ is the refractive index of the first retardation member for a varied wavelength, $n1b(h)$ is the refractive index of a section of the second retardation member for the varied wavelength, wherein the section is separated by a distance h from the optical axis, and d is a thickness of the second retardation member, and the phase difference is opposite to the aberration caused by the wavelength variation of the first fight beam.

45. The optical pickup of claim 43, wherein the phase difference caused by the first or second aberration correction element according to a wavelength varied from the wavelength for which the objective lens is designed is expressed as $(n1a - n1b(h)) \cdot d$, wherein $n1a$ is the refractive index of the first or third retardation member for the varied wavelength, $n1b(h)$ is the refractive index of a section of the second or fourth retardation member for the varied wavelength, wherein the section is separated by a distance h from the optical axis, and d is a thickness of the second or fourth retardation member, and the phase difference is opposite to the aberration caused by the wavelength variation of the first light beam, or the difference in wavelength between the first and the second light beams.

46. An optical pickup for a recording/reproduction system comprising a recording medium, the optical pickup comprising:

a light source emitting a polarized light beam comprising a wavelength suitable for the recording medium;

an objective lens focusing the polarized light beam to form a light spot on the recording medium;

an optical path changing unit arranged on an optical path between the light source and the objective lens, altering a traveling path of the polarized light beam;

a first retardation member;

a second retardation member combined with the first retardation member, wherein the first retardation member and the second retardation member comprise different refractive indices for the polarized light beam;

an aberration correction element arranged on the optical path between the optical path changing unit and the objective lens to correct chromatic aberration caused by a wavelength variation of the polarized light beam, wherein the aberration correction element comprises the first retardation member and the second retardation member; and a photodetector receiving the polarized light beam through the objective lens and the optical path changing unit after the polarized light beam is reflected from the recording medium, wherein a phase difference caused by the first and the second retardation members according to a wavelength variation of the first polarized light beam increases or decreases with respect to distance from an optical axis between the first light source and the recording medium.

* * * * *

UNITED STATES PATENT AND TRADEMARK OFFICE
CERTIFICATE OF CORRECTION

PATENT NO. : 6,853,614 B2
DATED : February 8, 2005
INVENTOR(S) : Tae-kyung Kim et al.

It is certified that error appears in the above-identified patent and that said Letters Patent is hereby corrected as shown below:

Column 15,
Line 59, change "connection" to -- correction --.

Column 16,
Line 39, change ";" to -- , --.

Column 17,
Line 38, change ";" to -- , --.

Signed and Sealed this

Ninth Day of August, 2005

JON W. DUDAS
*Director of the United States Patent and Trademark Office*